C. W. MACCORD.
Fishing-Reels.
No. 147,414.            Patented Feb. 10, 1874.
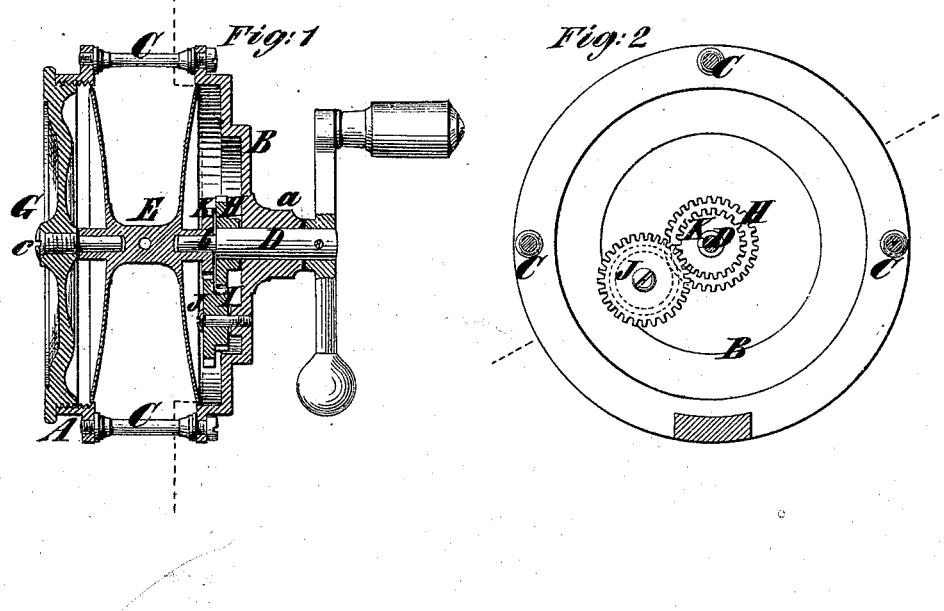
Witnesses
Michael Ryan
Fred Haynes
Charles W. MacCord
by his Attorneys
Brown & Allen

UNITED STATES PATENT OFFICE.

CHARLES W. MacCORD, OF WEEHAWKEN, NEW JERSEY.

IMPROVEMENT IN FISHING-REELS.

Specification forming part of Letters Patent No. 147,414, dated February 10, 1874; application filed November 1, 1873.

*To all whom it may concern:*

Be it known that I, CHARLES W. MACCORD, of Weehawken, in the county of Hudson and State of New Jersey, have invented an Improved Reel for Fishing-Rods, of which the following is a specification:

The object of this invention is to enable the angler to exchange one line for another, or to replace a damaged one, with greater facility than is possible with a reel as hitherto constructed. To this end, my invention consists, first, in so constructing the spool containing the line that it may be removed and replaced at pleasure; and, second, in providing one of the end plates of the frame of the reel with an opening of sufficient size, fitted with a suitable cap or cover, secured in any convenient manner, so that the spool may be taken out by simply removing the cap.

The detachable spools may be used in a "simple" or "plain" reel, as well as in a "multiplying" one; but it will be more convenient to explain first the improved arrangement of the latter, reference being made to the accompanying drawings, in which—

Figure 1 is a central axial section of the improved reel. Fig. 2 is another section taken transversely to its axis.

Similar letters of reference indicate corresponding parts in both figures.

The peculiarity of the frame of the reel consists in the construction of the end plates A and B, which are united in the usual manner by the stretchers or short bars C C. The plate A is annular, and its inner circumference, which is slightly larger than the spool E, is screw-threaded for the reception of a cap or cover, which closes the opening in said plate. The spool is removed through the opening in the plate A. The cap or cover might be hinged to said plate and secured by a catch; but I deem it preferable to screw the cover into the plate, as shown in the drawing. The plate B supports the crank-shaft D, being provided, if desired, with a boss, *a*, for that purpose. Moreover, it is recessed on its inner side to contain the system of gear-wheels establishing the connection between said shaft and the spool E. The spool, which is made in the usual way, with two flanges convex on their opposite sides, is supported on a journal, *b*, on the end of the crank-shaft D, and a stud or pin, *c*, provided opposite it; although pivots or journals may be formed in the axle of the spool, turning in holes or bearings in the shaft D and the cover G. A large gear-wheel, H, on the crank-shaft, gears into a smaller one, I, which is formed with, or secured to, a smaller one, J, concentric with it. The two wheels I J turn upon a stud fixed within the plate B; and the larger wheel J, gearing into a smaller one, K, fixed on the axle of the spool, transmits its motion to the spool itself, the velocity of the latter being greater than that of the crank-shaft in any desired ratio, by reason of the disparity in the diameters of the gear-wheels.

The adjacent flange of the spool incloses the gear-wheels, which are contained in the plate B, so that a separate box to protect them is not necessary, thus making the reel lighter. The reel is also more compact and symmetrical, because its several parts are concentric; this also lessens the cost by enabling the maker to finish the whole in the lathe.

When multiplying-gear is not to be used, or if that of the common arrangement be preferred, I have devised another very simple way of connecting a detachable spool with the crank-shaft. It consists, merely, of a flat screw-driver-like portion on the inner end of the central shaft, fitting into a notch in the end of the spool's axle, an extension of the shaft being formed into a pivot, fitting into a hole drilled in the axle of the spool, for the purpose of supporting the spool in its axial position. The flat portion and the pivot may also be formed upon the axle of the spool, and the notch and the hole in the central shaft.

Whenever, for any reason, it is desirable to exchange one line for another, it is simply necessary to remove the cover G from the opening in the plate A, withdraw the spool that is within the reel, insert its substitute, and replace the cover. All this may be done in a few seconds, and without detaching the reel from the rod. Thus all the inconvenience formerly experienced in replacing a line is obviated. Moreover, the operation of coiling a line upon the spool is much more readily performed when the latter is detached than when it is confined within the frame.

What I claim as my invention is—

1. A fishing-reel, constructed and adapted for the ready attachment and removal of the spool, substantially as described.

2. The combination, in a fishing-reel, of a detachable cap or cover, fitted to an opening in one of its end plates, and one or more removable spools, substantially as and for the purpose herein set forth.

CHARLES W. MacCORD.

Witnesses:
    HENRY T. BROWN,
    MICHAEL RYAN.